Feb. 18, 1936. H. J. FINKE, JR 2,031,257
EMERGENCY WHEEL
Filed Feb. 8, 1935 4 Sheets-Sheet 1

Inventor
H. J. Finke, Jr.

By Clarence A. O'Brien
Attorney

Feb. 18, 1936. H. J. FINKE, JR 2,031,257
EMERGENCY WHEEL
Filed Feb. 8, 1935 4 Sheets-Sheet 2
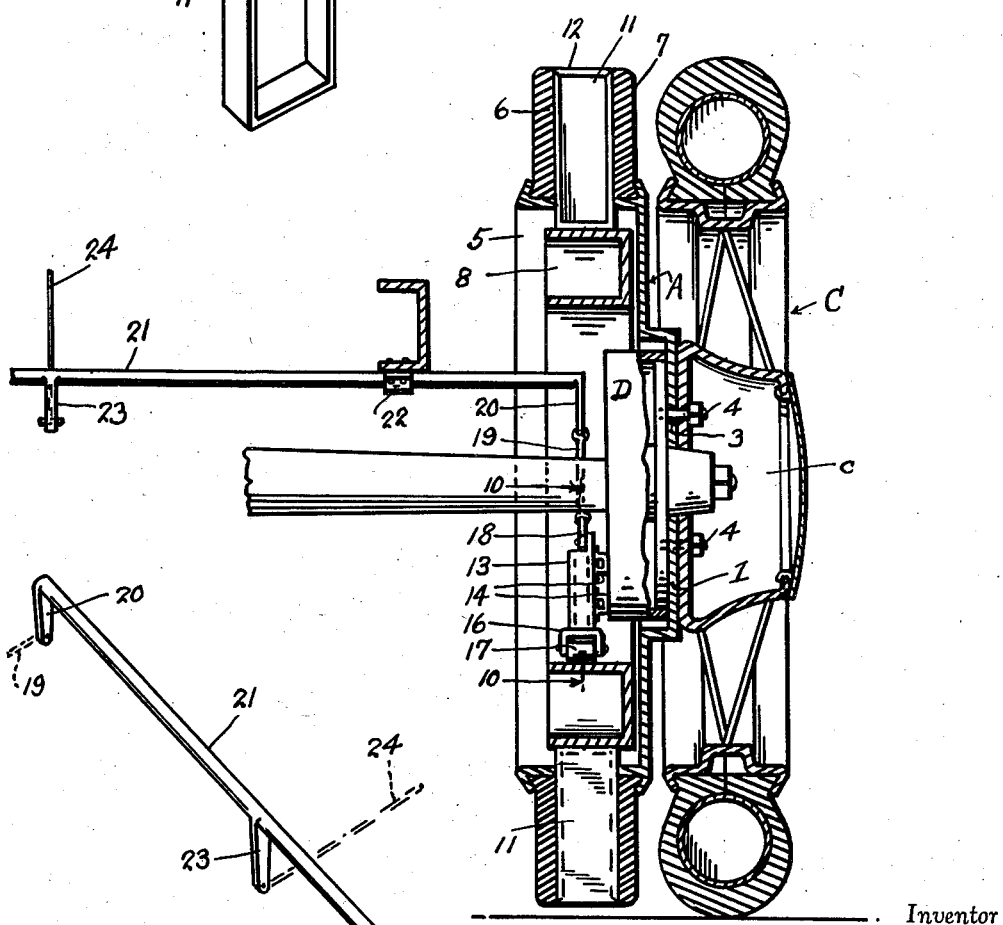

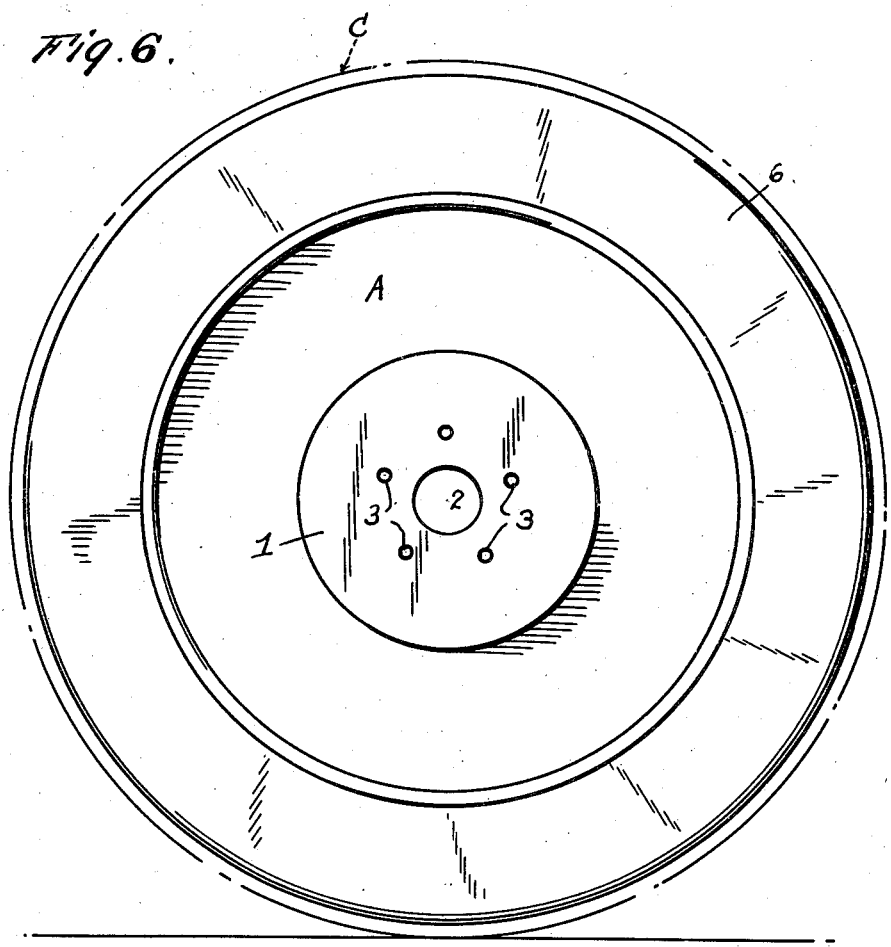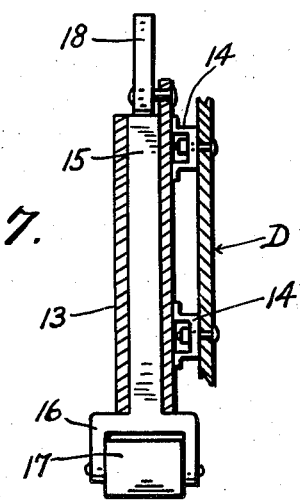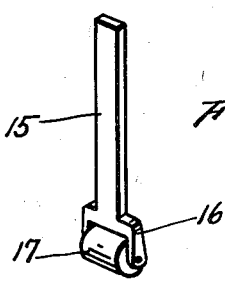

Feb. 18, 1936. H. J. FINKE, JR 2,031,257
EMERGENCY WHEEL
Filed Feb. 8, 1935 4 Sheets-Sheet 4
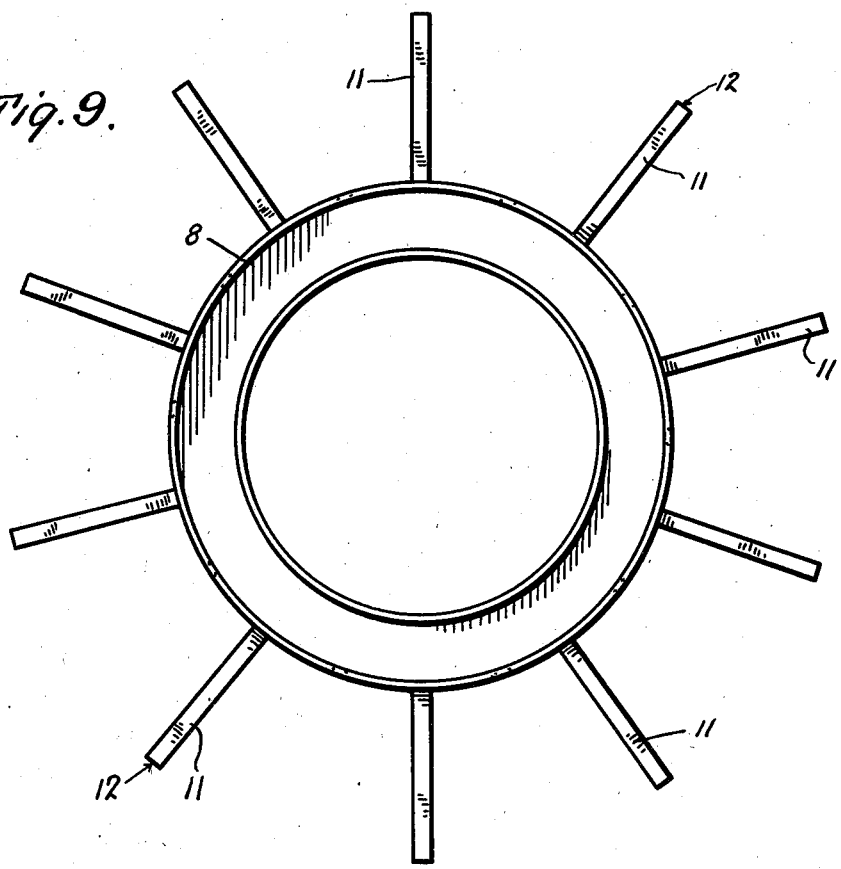
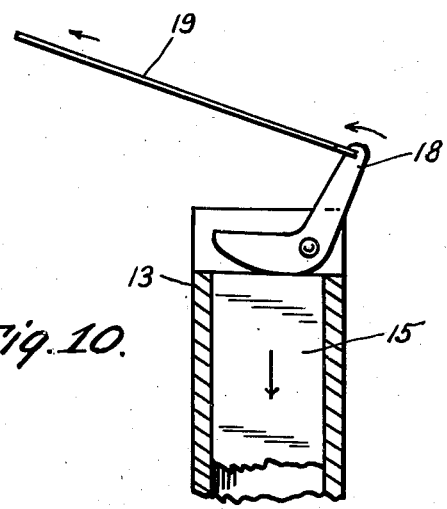
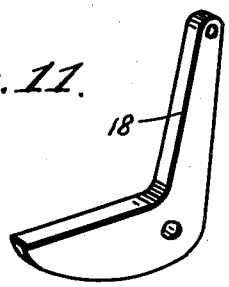
Inventor
H. J. Finke, Jr.
By Clarence A. O'Brien
Attorney Patented Feb. 18, 1936

2,031,257

UNITED STATES PATENT OFFICE 2,031,257

EMERGENCY WHEEL

Henry Joseph Finke, Jr., Etna, Pa.

Application February 8, 1935, Serial No. 5,655

2 Claims. (Cl. 301—49)

This invention relates to an emergency wheel and non-skid device for motor vehicles, the general object of the invention being to provide a wheel adapted to be attached to each end of a wheel-carrying shaft or axle of the vehicle and inwardly of the main wheel and of a smaller diameter than the main wheel so that if the tire of the main wheel should become deflated, the emergency wheel will take the place of the main wheel and permit the vehicle to be driven to a service station without damage to the tire of the main wheel.

Another object of the invention is to provide lugs in parts of the emergency wheel with manually operated means for projecting the lugs whenever desired so as to prevent skidding or slipping of the vehicle.

This invention also consists in certain other features of construction and in the combination and arrangement of several parts, to be hereinafter fully described, illustrated in the accompanying drawings and specifically pointed out in the appended claims.

In describing the invention in detail, reference will be had to the acccompanying drawings wherein like characters denote like or corresponding parts throughout the several views, and in which:

Fig. 2 is a section on line 2—2 of Fig. 1.

Fig. 3 is a perspective view of one of the lugs.

Fig. 4 is a view of the operating lever.

Fig. 6 is a view of the outer face of the emergency wheel.

Fig. 7 is a section on line 7—7 of Fig. 1.

Fig. 8 is a view of the roller-carrying member.

Fig. 9 is a view of the channel ring and the lugs.

Fig. 10 is a section on line 10—10 of Fig. 2.

Fig. 11 is a view of the cam lever.

Figure 1:
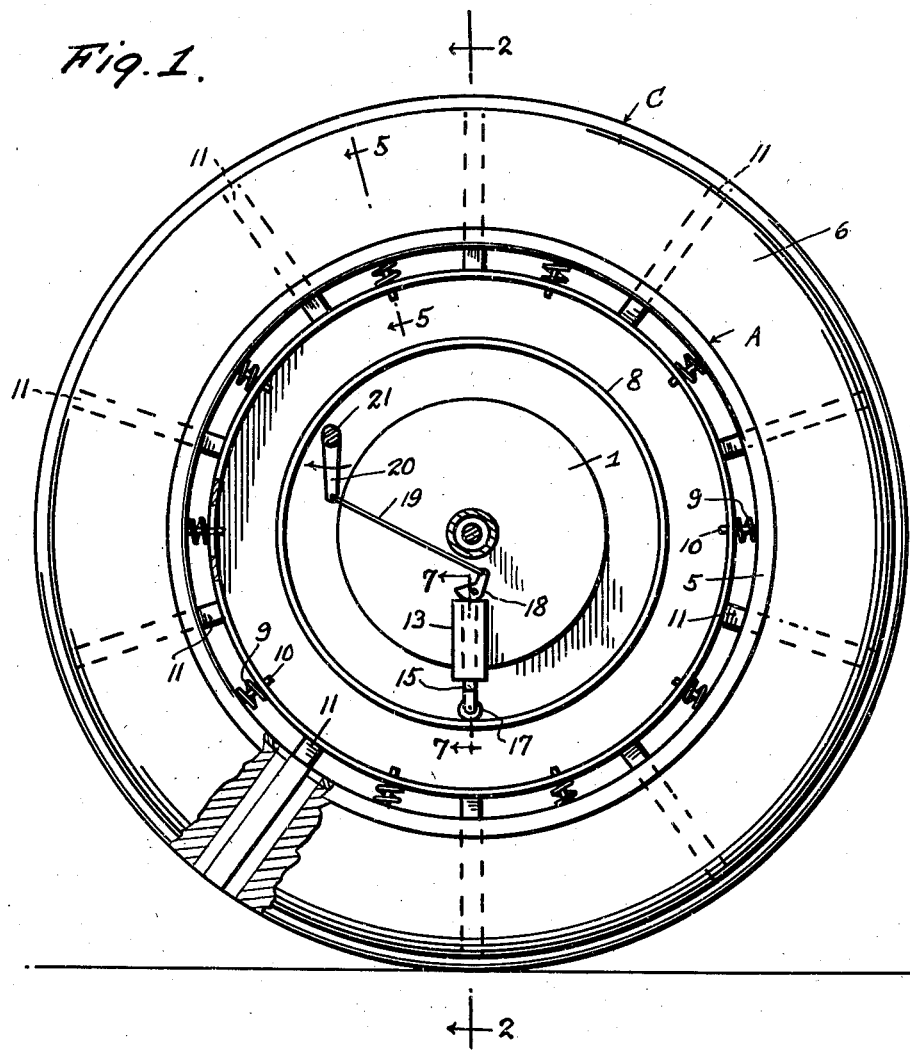
Fig. 1 is a view looking toward the inner face of the emergency wheel with parts in section, this view also showing portions of the tire of the main wheel.
Figure 5:
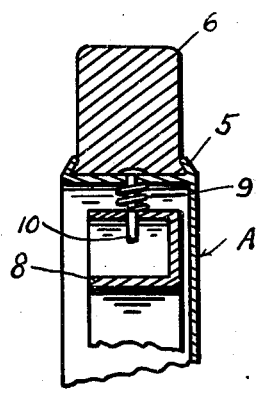
Fig. 5 is a section on line 5—5 of Fig. 1.

In these drawings, the letter A indicates the emergency wheel which is pressed or otherwise formed of metal and is of substantially disk-shape and has its central portion formed with a projecting circular part 1 which fits between the brake drum E and the hub c of the main wheel C and has a centrally arranged opening 2 therein through which passes the spindle or driving part which drives the main wheel from the drive shaft. This part 1 is also provided with the holes 3 for receiving the bolts 4 which connect the hub of the main wheel to the brake drum. A rim 5 is formed on the emergency wheel to receive a solid rubber tire 6 which is provided with the radial slots 7 and as will be seen the diameter of the combined emergency wheel and the tire is less than the diameter of the main wheel and its tire so that when the main tire is fully inflated, the emergency wheel will not touch the ground and if the main tire becomes deflated, then the tire of the emergency wheel will contact the ground and thus the motor vehicle can proceed to a service station or other point where the tire can be repaired.

A channel ring 8 is yieldably supported within the space formed by the rim 5 by the springs 9 encircling the pins 10 which extend inwardly from the rim 5 and pass through slots in the outer flange of the ring 8. The outer flange of the ring 8 has the inner ends of the lugs 11 attached thereto by welding or in any other suitable manner and these lugs are channel-shaped in cross section with their inner ends closed and their outer ends open and beveled as shown at 12 in Fig. 3. These lugs pass through the slots 7 in the tire 6 and the springs 9 normally hold the channel ring in position with the lugs enclosed by the tire 6 as shown in Fig. 2. A vertically arranged sleeve 13 is attached to the brake drum E by the brackets 14 as shown more particularly in Fig. 7 and a bar or shank 15 is slidably arranged in the sleeve and has its lower end of yoke-shape as shown at 16 and this yoke carries a roller 17 which engages the inner circumference of the ring 8. A cam lever 18 is pivoted to an extended part of the sleeve at the upper end thereof and a cable 19 has one end connected to the upper end of the lever and its other end to a depending arm 20 on a rock shaft 21 journaled in the frame of the motor vehicle as shown at 22 in Fig. 2. The shaft is also provided with an intermediate part 23 which is connected by a cable 24 to a lever or the like located adjacent the driving wheel so that the driver can rock the shaft 21 and when this is done, the cam lever 18 will press upon the shank 15 and thus depress the same and force the roller against the channel ring 8 which will move the ring so that the studs or lugs 11 at the lower part of the wheel will be projected from the tire 6 and thus contact the road surface to prevent skidding or slipping of the vehicle when passing over slippery parts of the road. Fig. 4 shows the rock shaft 21 provided with the arm 20 at each end thereof so that the one shaft 21 will operate the lugs of both wheels.

Thus it will be seen that I have provided means which not only acts as an emergency wheel for enabling the vehicle to be continued in use when a tire becomes deflated but also means whereby the driver can project some of the lugs as he is passing over a slippery part of the road so that it is not necessary for the driver to put on the chains and as soon as the slippery part has been passed, the parts can be returned to inoperative position.

The openings in the tire and the rim 5 as well as the slots in the outer portion of the ring 8 are enlarged circumferentially so as to permit sufficient movement of the lugs 11 and pins 10 to permit downward movement of the ring 8 without interference from the lugs and pins at opposite sides of a vertical plane through the center of the wheel.

It is thought from the foregoing description that the advantages and novel features of the invention will be readily apparent.

It is to be understood that changes may be made in the construction and in the combination and arrangement of the several parts, provided that such changes fall within the scope of the appended claims.

I claim:

1. An emergency wheel and non-skid device for a motor vehicle comprising a wheel body, a tire carried thereby and of less diameter than the tire of the main wheel, means for connecting the hub portion of the emergency wheel to the hub of the main wheel, the rim and tire of the emergency wheel having radial slots therein, a floating ring carried by the emergency wheel, spring means for holding the floating ring in a central position, radial lugs carried by the ring and passing through the slots, and manually operated means for moving the lower portion of the ring downwardly to project the lugs of said portion against the road surface, said means including a sleeve vertically arranged and connected to a part of the vehicle, a shank slidably arranged in the sleeve, a roller at the lower end of the shank engaging the floating ring, a rock shaft, a cam lever pivoted to the sleeve and engaging the upper end of the shank, and means connecting the lever to the rock shaft for moving the lever into engagement with the shank when the shaft is rocked in one direction.

2. An emergency device comprising a wheel, including a rim having slots therein, a floating ring located within the rim and having radially extending lugs positioned in the slots, pins carried by said rim and extending radially inwardly, said ring having inner and outer spaced parts, apertures in the outer part, the inner ends of said pins being positioned in said apertures, springs on the pins and located between the rim and the ring, and means engaging the inner part of the ring and adapted to be operated to move the ring downwardly to project the lugs beyond the wheel at the outer part of the latter.

HENRY JOSEPH FINKE, Jr.